United States Patent
Schwab et al.

(10) Patent No.: US 10,732,716 B2
(45) Date of Patent: Aug. 4, 2020

(54) OPERATING UNIT FOR A DEVICE, IN PARTICULAR FOR A VEHICLE COMPONENT

(71) Applicant: BEHR-HELLA THERMOCONTROL GmbH, Stuttgart (DE)

(72) Inventors: Tobias Schwab, Lippstadt (DE); Harri Pankratz, Lippstadt (DE)

(73) Assignee: BEHR-HELLA THERMOCONTROL GMBH, Stuttgart (DE)

( * ) Notice: Subject to any disclaimer, the term of this patent is extended or adjusted under 35 U.S.C. 154(b) by 0 days.

(21) Appl. No.: 16/323,864

(22) PCT Filed: Jul. 10, 2017

(86) PCT No.: PCT/EP2017/067229
§ 371 (c)(1),
(2) Date: Feb. 7, 2019

(87) PCT Pub. No.: WO2018/028906
PCT Pub. Date: Feb. 15, 2018

(65) Prior Publication Data
US 2019/0163280 A1    May 30, 2019

(30) Foreign Application Priority Data
Aug. 9, 2016   (DE) .......................... 10 2016 114 697

(51) Int. Cl.
*G06F 3/01*         (2006.01)
*G06F 3/041*        (2006.01)
(Continued)

(52) U.S. Cl.
CPC .............. *G06F 3/016* (2013.01); *B60K 35/00* (2013.01); *B60K 37/00* (2013.01); *G06F 3/0414* (2013.01);
(Continued)

(58) Field of Classification Search
CPC ....................................................... G06F 3/016
(Continued)

(56) References Cited

U.S. PATENT DOCUMENTS 7,701,445 B2* 4/2010 Inokawa ................. G06F 3/016
345/156
10,503,260 B2* 12/2019 Pankratz ............... H01F 7/1638
(Continued)

FOREIGN PATENT DOCUMENTS

DE    11 2011 101 553 B4    8/2016

OTHER PUBLICATIONS

International Search Report issued in International Application No. PCT/EP2017/067229 dated Nov. 8, 2017.
(Continued)

*Primary Examiner* — William D Titcomb
(74) *Attorney, Agent, or Firm* — Morgan, Lewis & Bockius LLP

(57) ABSTRACT

The operating unit for a device, particularly for a vehicle component, is provided with a housing that has an operating panel and is provided for attachment in an apparatus, particularly a vehicle dashboard or vehicle center console, the operating panel being elastically mounted on the housing. Further, an actuator for mechanically exciting the operating panel when use of the operating panel is detected is provided. Finally, the operating unit also has a vibration compensation mass that is mechanically excitable by the or by an actuator when use of the operating panel is detected and is elastically mounted in and/or on the housing and is movable to essentially compensate for a motion of the housing when the actuator mechanically exciting the operating panel is activated. The operating unit has a backlit display that has a display unit and a backlight unit separate therefrom. The backlight unit serves as a vibration compensation mass.

7 Claims, 4 Drawing Sheets

(51) Int. Cl.
    *B60K 35/00*    (2006.01)
    *B60K 37/00*    (2006.01)
(52) U.S. Cl.
    CPC .... *B60K 2370/152* (2019.05); *B60K 2370/67* (2019.05)
(58) Field of Classification Search
    USPC ......................................................... 715/701
    See application file for complete search history.

(56) References Cited

U.S. PATENT DOCUMENTS

| | | | | |
|---|---|---|---|---|
| 2005/0253643 | A1* | 11/2005 | Inokawa | G06F 3/016 327/517 |
| 2011/0276878 | A1 | 11/2011 | Sormunen | |
| 2013/0127767 | A1 | 5/2013 | Sorvisto et al. | |
| 2016/0370536 | A1* | 12/2016 | Tan | G02B 6/0065 |
| 2018/0287477 | A1* | 10/2018 | Zu | H02P 25/032 |

OTHER PUBLICATIONS

Written Opinion issued in International Application No. PCT/EP2017/067229 dated Nov. 8, 2017.

* cited by examiner

OPERATING UNIT FOR A DEVICE, IN PARTICULAR FOR A VEHICLE COMPONENT

CROSS REFERENCE

This application is the U.S. National Phase under 35 U.S.C. § 371 of International Application No. PCT/EP2017/067229 filed on Jul. 10, 2017, which claims the benefit of German Application No. 10 2016 114 697.8 filed on Aug. 9, 2016, the entire contents of each are hereby incorporated by reference.

The invention relates to an operating unit for a device which in particular is a vehicle component. The invention specifically relates to operating units with active haptic feedback with compensation of forces, so that vibrations of the operating unit occurring due to the active haptic feedback are compensated or at least damped.

Display assemblies in motor vehicles are often equipped with active haptic feedback. Here, the triggering of the feedback on an operating panel having a non-negligible mass should not generate an undesirable dynamic transmission of force on the vehicle, since the same may result in parasitic noises or vibrations in the vehicle, depending on the installation situation.

Further, it is intended that the haptic feedback is largely independent of the elasticity of the mounting in the vehicle.

Figure 1:
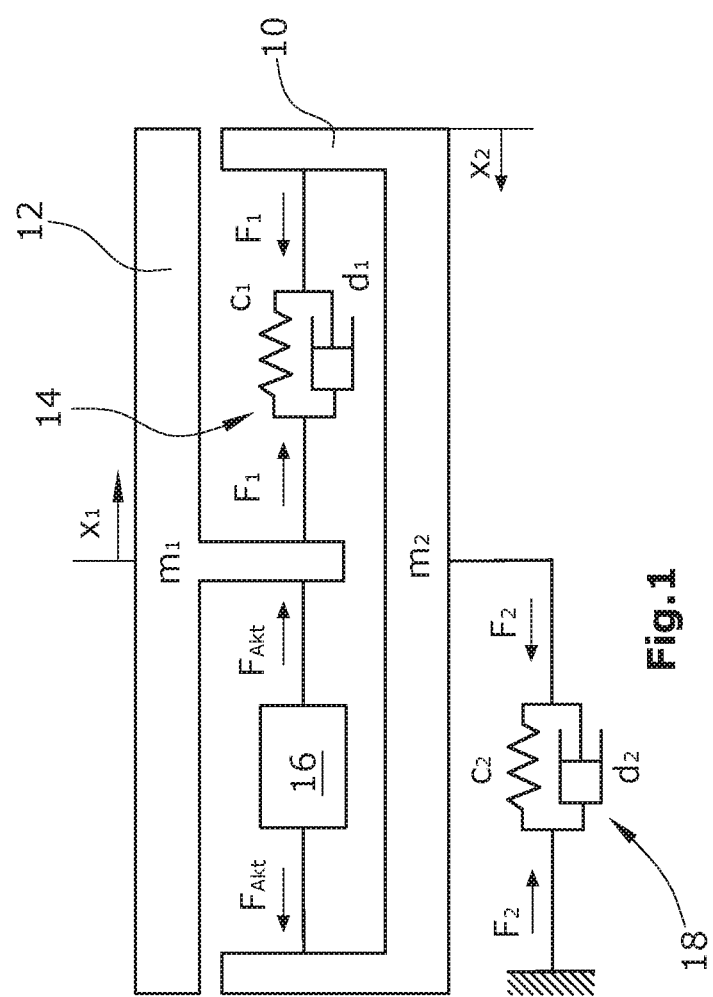

A device equipped with active haptic feedback substantially consist of an operating panel (e.g. a display) elastically mounted to the device housing by a spring system, and an actuator for deflecting the operating panel. FIG. 1 illustrates the forces acting in such a device structure.

For generating the haptic feedback, the display is deflected from its rest position with a certain trajectory $x_1(t)$. here, the acceleration of the display $a_1(t)$ may take values of more than 30 m/s, which, given a moved display mass $m_1$ of more than 0.5 kg and a generally lesser housing mass $m_2$, results in a non-negligible dynamic force $F_2(t)$ acting on the device mounting in the vehicle.

With a rigid device holder or mounting (rigid spring system $c_2$, $d_2$) this force varying quickly in time may cause undesirable noises or vibrations in the vehicle.

With a soft mounting (soft spring system $c_2$, $d_2$), however, observing installation tolerances for the device in the vehicle is difficult. Further, due to the presence of an additional degree of freedom, namely the housing movement $x_2(t)$ and thus also additional resonance frequencies in the system, it may eventually not be possible to adjust the necessary actuator force progression $F_{Akt}(t)$.

Operating units according to the precharacterizing part of claim 1 are known from DE 11 2011 101 553 B4 and US 2013/0127767 A1.

It is an object of the invention to provide a concept for an operating unit with active haptic feedback, which is improved with respect to the generation of parasitic noises or vibrations.

To achieve the object, the invention provides an operating unit for a device, e.g. for a vehicle component, in particular a man-machine interface (MMI or HMI), wherein the operating unit is provided with a housing which comprises an operating panel and is provided for attachment in an apparatus, particularly a vehicle dashboard or vehicle center console, the operating panel being elastically supported at the housing, an actuator for mechanically exciting the operating panel when use of the operating panel is detected, a balance weight, the balance weight being mechanically excitable by the or by an actuator when use of the operating panel is detected and is elastically supported in and/or at the housing and/or is elastically supported at the operating panel, the balance weight being movable to compensate for the forces acting on the housing when the operating panel is mechanically excited (i.e. to substantially compensate for the movement of the housing upon activation of the actuator mechanically exciting the operating panel), the operating panel being designed as a front side of a display unit that is elastically supported at the housing, and the balance weight being designed as a backlight unit for backlighting the display unit.

A characteristic feature of the invention is the use of a backlit display, wherein the particularity is that the backlight unit which comprises the light sources and as a rule, but not necessarily, also a diffusor for the homogenizing diffusion of the backlight, is separated from the actual display unit so that both are movable independent from each other. This may be used to provide vibration compensation by vectorially opposite excitation movements of the display unit and the backlight unit. Unless the backlight unit has any diffusor characteristics, a diffusor is situated, suitably in particular in a fixed manner, between the backlight unit and the display unit, e.g. on the rear side of the display unit.

In particular, it is advantageous if the balance weight is movable phase-shifted by substantially 180° with respect to the excitation movement of the operating panel, the movement stroke of the balance weight is selected with consideration to at least the relation between the mass of the operating panel to the mass of the balance weight.

Thus, the invention provides that the backlight unit is excitable vectorially oppositely to the display unit. It may further be advantageous if the movement strokes of the display unit and the backlight unit, when excited by the actuator or the actuators, are configured as a function of the relation between the respective masses of the display unit and the backlight unit and/or the relation between the position of the centers of mass of the display unit and the backlight unit and/or the spring damper elements of the respective elastic supports of the of the display unit and the backlight unit at the housing and/or the magnitude of the vectorially oppositely directed movement stroke components or movement strokes of the of the display unit and the backlight unit.

In a further advantageous embodiment of the invention it may be provided that a common actuator is provided for moving both the display unit and the backlight unit, the actuator comprising length-variable actuator element with two ends averted from each other, the distance between which being variable by movement in opposite directions and one end of which being operatively connected with the display unit and the other end being operatively connected with the backlight unit for mechanical excitation of the display unit and the backlight unit.

According to the invention it may be provided that the actuator or the actuators operate electro-mechanically or piezo-electrically.

Figure 2:
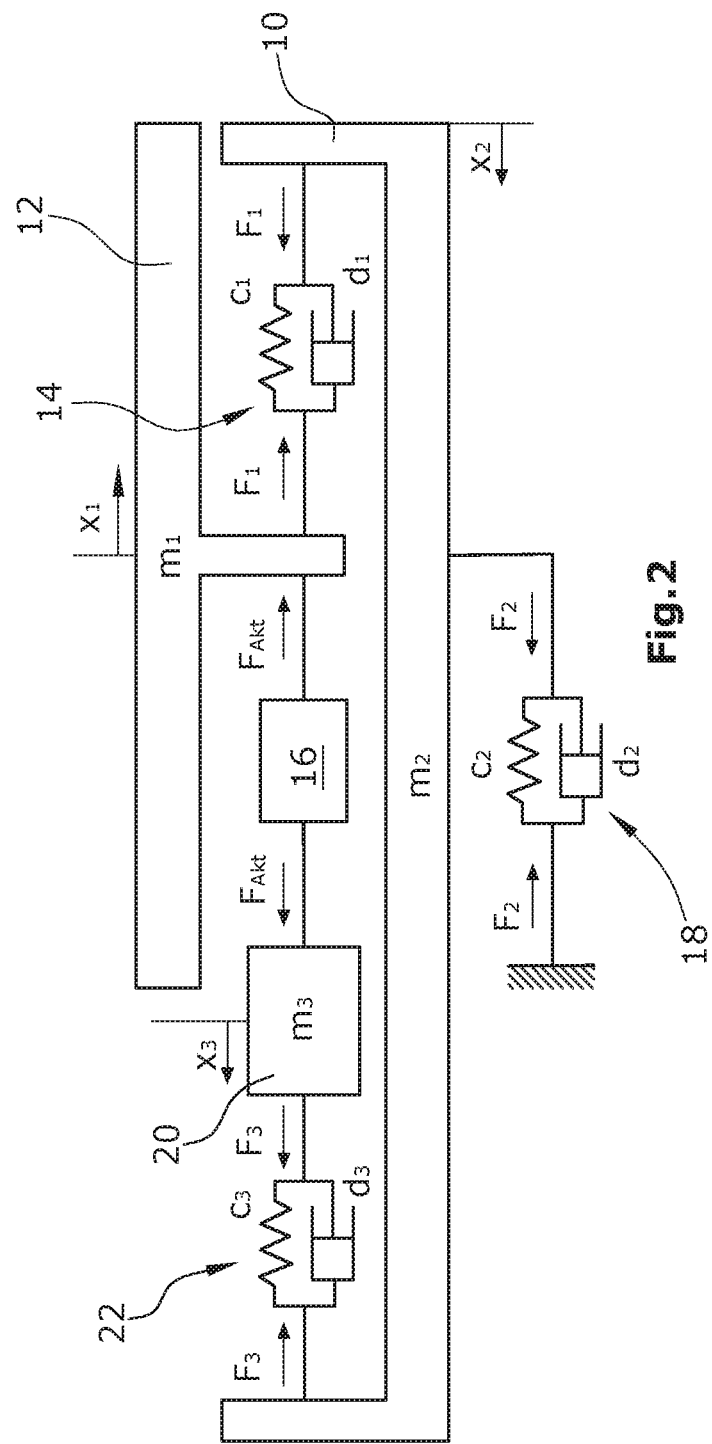
Figure 3:
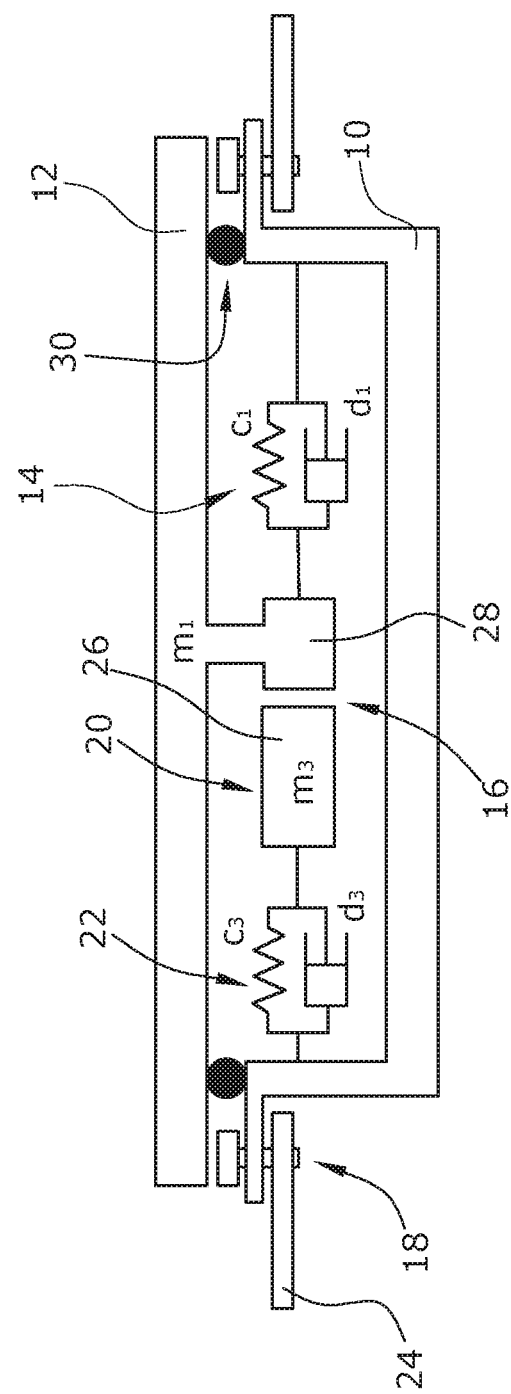
Figure 4:
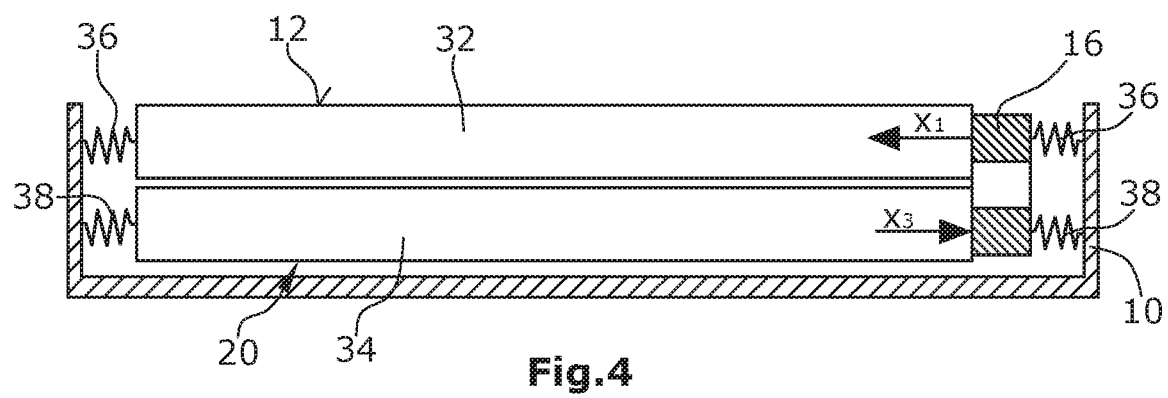
Figure 5:
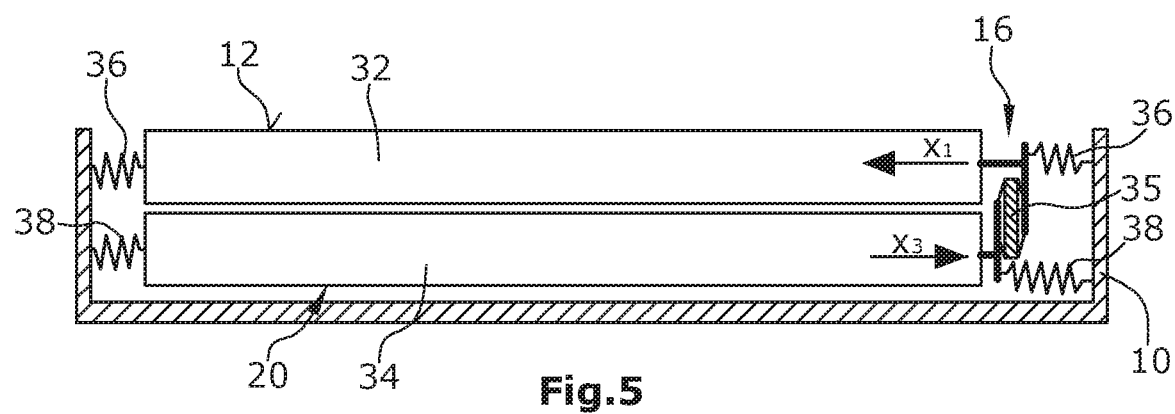
Figure 6:
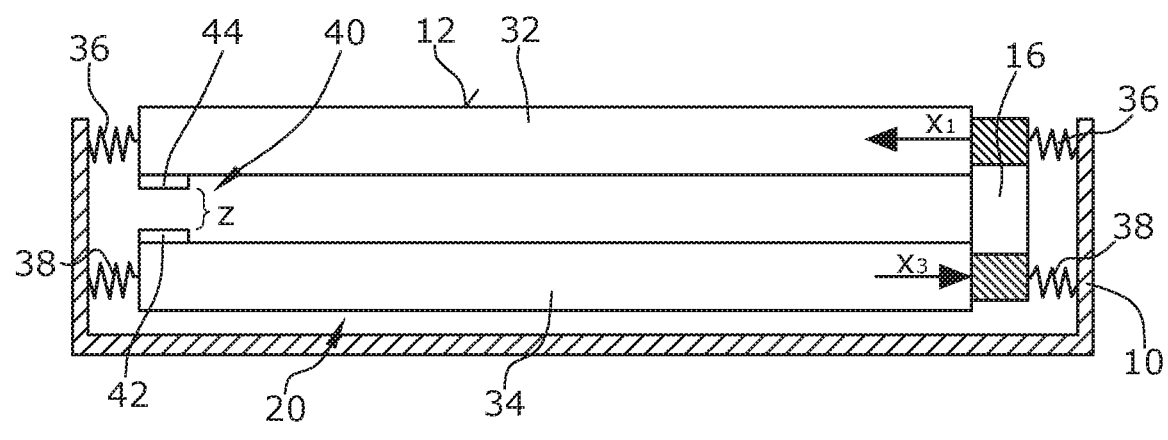

The invention will be explained in more detail hereunder with reference to a plurality of embodiments and with reference to the drawings. Specifically, the Figures show:

FIG. 1 a schematic illustration of the forces occurring in an operating unit with active haptic feedback, FIG. 2 a schematic illustration of the forces occurring when a counterweight is used as a compensation mass as provided by the invention, FIG. 3 a schematic illustration of a structure of a counterforce-free haptic feedback in an operating unit, FIG. 4 a schematic illustration of a mechanical structure for transmitting an impulse to an operator surface without resultant total forces or total impulses on the mechanical mounting, FIG. 5 a schematic illustration of the mechanical structure of FIG. 4, but with a piezo-electrically operating actuator, and FIG. 6 an extension of the concept of the structure of FIG. 4 by a device for detecting an operating force.

With reference to FIGS. 1 to 3, a general approach will be made to the concept of mass compensation in an operating unit with force feedback.

According to the invention, it is proposed to use an elastically supported (see spring-mass system 22) movable counter mass 20 between the actuator 16 and the housing 10 to compensate for the forces acting on the housing 10 (FIGS. 1 and 2).

Given a corresponding design of the additional spring-mass system 22 or $c_3$, $d_3$, $m_3$, the resultant force $F_2(t)$ acting on the vehicle can be eliminated (the static forces generated by gravity are of no importance in the generation of noises or vibrations).

For an arbitrarily given display deflection $x_1(t)$, the deflection $x_2(t)$/movement of the device housing and thus also the force $F_2(t)$ on the device mounting can be eliminated under the following conditions:

$$c_3 = c_1 \frac{m_3}{m_1}, d_3 = d_1 \frac{m_3}{m_1}$$

This results in the deflection of the counter mass 20:

$$x_3(t) = x_1(t) \frac{m_1}{m_3}$$

Under these conditions, the elasticity of the device mounting 18 does not have any influence on the haptic feedback either. The counter mass 20 or $m_3$ is generally limited by the installation space specifications and is smaller than the display mass $m_1$. Ideally, it can be realized as a part of the actuator 16.

The present invention allows
to generate a haptic feedback on surfaces having a mass without dynamic action of force on the environment,
to generate a haptic feedback in an operating device, which is independent of the elasticity of the device mounting.

In FIG. 3, a device with a counterforce-free haptic feedback is shown schematically.

In the embodiment illustrated, the actuator 16 is configured as a pull magnet and comprises a laminated stator core with the actuator coil (coil 26) and a laminated armature core (armature 28) fixedly coupled to the display 10. The stator forms the movable balancing weight 20. When adjusting the air gap in the pull magnet, the maximum deflection of the display 10 and the balancing weight 20 relative to each other has to be taken into consideration. The stator 26 is elastically supported (spring-mass system 22) at the housing 10, but may instead also be elastically coupled to the operating panel 12.

Hereinafter, possible mechanic structures of an operating unit having a display and a backlit operating element will be explained in detail with reference to FIGS. 4 to 6. As far as the reference numerals used in these Figures are the same as those used in FIGS. 1 to 3, they refer to elements identical in construction or function.

With reference to FIG. 4, the actuator 16 generates forces after its activation, which lead to an acceleration and movement of two separate components fastened thereto, i.e. a (e.g. LCD) display unit 32 and a backlight unit 34 for the display unit 32. The movements of the display unit 32 and the backlight unit 34 are indicated by $x_1$ and $x_2$. The actuator 16 is substantially characterized in that it deflects the display unit 32 and the backlight unit 34 phase-shifted by 180° relative to each other. For this purpose, the actuator 16 may be designed e.g. as a solenoid, a piezo element etc. The arrangement of the actuator 16 illustrated in FIG. 4 is a possible form of realization. In general, the integration of the actuator 16 is determined only by the resulting triggering of the movements $x_1$ and $x_2$ of the display unit 32 and the backlight unit 34, which may be effected e.g. by arranging the actuator 16 beneath the backlight unit 34.

FIG. 5 illustrates an embodiment comprising a piezo actuator 16. The actuator 16 includes a piezo-electric material 35 which deforms mechanically when a voltage is applied. The display unit 32 and the backlight unit 34 are mechanically coupled to different sides of the piezo-electric material 35 of the actuator 16.

The display unit 32 comprises a surface (operating panel 12) configured to be touched by the user. The backlight unit 34 cannot be touched by the user and is further decoupled from the touchable surface of the display unit 32 and the display unit 32 itself. The user feels the feedback movement of the display unit 32 after excitation by the actuator 16 through the transmission of force, e.g. an impulse, onto the respective input means, i.e. e.g. a finger, so that a haptic feedback is obtained after a valid interaction with the operating unit.

A mechanic fastening in the housing 10, which is free of total impulses and free of total forces, is achieved if
the display unit 32 moves in a direction vectorially opposite to the backlight unit 34, e.g. if the display unit 32 moves in a positive X direction and the backlight unit 34 simultaneously moves in a negative X direction, and
the spring-damper elements 36 and 38, by which the display unit 32 and the backlight unit 34 are respectively elastically coupled to the housing 10, are designed such that the received local impulses of the display unit 32 and the backlight unit 34 cancel each other out in total.

In general, this approach does not require, but neither excludes the following:
identical mass of the display unit 32 and the backlight unit 34,
identical course ($x_1$, $x_3$, according to absolute value) of the display unit 32 and the backlight unit 34, and
identity of the spring-damper elements 36, 38.

Specifically, the operating element has the following structure:
user surface, e.g. cover glass with bonded touch sensor and LC cells of a LC display of the LCD display unit 32, comprising two linear polarizers, TFT and color filter glass, LC and all components relevant to its functionality, and backlight unit 34 (backlight) of the LC display with optical diffusor layers, LEDs and all relevant components.

Compared to the prior art of LC displays in which the display unit 32 and the backlight unit 34 cannot perform any relative movements with respect to each other, the invention provides for a free movement between both components. Both components fulfill their full functionality, as is known from backlit displays. Further, the relative movements of the display unit 32 and the backlight unit 34 should be so small that no negative optical effects, e.g. due to the escape of light or the sealing-off of light, can be observed (movements smaller than 1 mm each). The entry of dust and/or water into the display is prevented by an elastic bezel (e.g. soft rubber lining). The elastic bezel further prevents the escape of light of the backlight unit 34.

Compared to the prior art for haptic feedbacks of a device having a display element (display) wherein the entire display element is moved, including the backlight, the invention reduces the mass to be moved, which is coupled to the user surface, to the weight of the backlight unit 34 and the components mechanically coupled to the same. Further, the backlight unit 34 serves as a balance weight 20 for the display unit 32 and thus as a crucial component for a design of the overall device that is free from total impulses. In particular, no additional counterweights are required for eliminating the total impulse, and thus the overall system weight is reduced.

Due to the small mass of the components connected to the user surface, either a stronger haptic feedback to the user is possible, while using the same actuator 16, or it is possible to design a smaller actuator 16 while providing the same perceptible feedback.

Summarizing, the invention described provides a haptic feedback on the user surface without transmission of impulses or forces from the operating panel display unit 32 to the device environment, which is achieved by dividing the LC display, as well as by the additional functionality of the backlight unit 34 (backlight) as a balance weight 20 with respect to the display unit 32 having the user operating surface.

FIG. 6 illustrates an extension of the concept in FIGS. 4 and 5 by the detection of the operating force upon interaction of the user with the display unit 32.

For detecting the operating force, a distance sensor system 40 formed e.g. by a plurality of pairs of optical transmitters 42 and receivers 44, the sensor system operating e.g. capacitively, resistively, inductively or optically. By action on the part of the user, a change in the relative distance z between the display unit 32 and the backlight unit 34 occurs upon the manual operation of the operating panel, so that one or a plurality of system observables of the transmitters 42 and the receivers 44 can be used to detect the change.

The integration of the distance sensor system 40 for the above-mentioned special LC display is effected e.g. in the respected bezels (frames) of the display unit 32 and the backlight unit 34.

LIST OF REFERENCE NUMERALS 10 housing
12 operating panel
14 elastic coupling of the operating panel 12 to the housing
16 actuator
18 coupling of the housing to the vehicle
20 balance weight
22 elastic coupling of the balance weight to the housing and/or the operating panel 12
24 vehicle or dashboard of the vehicle,
26 stator of the pull magnet configured as an actuator
28 armature of the pull magnet
30 operating panel guide for the movement upon haptic feedback
32 display unit
34 backlight unit
35 piezo-electric material
36 spring-damper element
38 spring-damper element
40 distance sensor system
42 transmitter of the distance sensor system
44 receiver of the distance sensor system
$m_1$ mass of the operating panel
$x_1(t)$ deflection of the operating panel
$F_{Ak}(t)$ actuator force progress
$F_1(t)$ force of the operating panel acting on the housing upon excitation thereof ($F_1(t)=F_{Akt}-m_1 \times a_1$)
$c_1$ spring constant of the elastic coupling of the operating panel to the housing
$d_1$ damping of the elastic coupling of the operating panel to the housing
$m_2$ mass of the housing
$x_2(t)$ deflection of the housing due to the force exerted by the mechanically excited operating panel
$F_2(t)$ force acting on the housing mounting
$m_3$ mass of the balance weight
$x_3(t)$ deflection of the balance weight
$F_3$ force acting on the housing by the balance weight
$c_3$ spring constant of the elastic coupling of the balance weight to the housing
$d_3$ damping of the elastic coupling of the balance weight to the housing
z distance between display unit and backlight unit

The invention claimed is:

1. An operating unit for a device, comprising:
a housing which comprises an operating panel and is provided for attachment in a vehicle dashboard or vehicle center console, the operating panel being elastically supported at the housing;
an actuator for mechanically exciting the operating panel when an operation of the operating panel is detected; and
a balance weight, wherein:
the balance weight is mechanically excitable by the or by an actuator when the operation of the operating panel is detected,
the balance weight is elastically supported in and/or at the housing and/or is elastically supported at the operating panel,
the balance weight is movable to compensate for forces acting on the housing when the operating panel is mechanically excited,
the operating panel is designed as a front side of a display unit that is elastically supported at the housing, and
the balance weight is designed as a backlight unit for backlighting the display unit.

2. The operating unit of claim 1, wherein the movement strokes of the display unit and the backlight unit, when excited by the actuator or the actuators, are configured or determined as a function of the relation between the respective masses of the display unit and the backlight unit and/or the relation between the position of the centers of mass of the display unit and the backlight unit and/or the spring damper elements of the respective elastic supports of the display unit and the backlight unit at the housing and/or the magnitude of the vectorially oppositely directed movement stroke components or movement strokes of the display unit and the backlight unit.

3. The operating unit of claim 1, wherein a common actuator is provided for moving both the display unit and the backlight unit, the actuator comprising length-variable actuator element with two ends averted from each other, the distance between the ends being variable by movement in opposite directions and one end being operatively connected with the display unit and the other end being operatively connected with the backlight unit for mechanical excitation of the display unit and the backlight unit.

4. The operating unit of claim 1, wherein the actuator or the actuators operates/operate electromechanically or piezo-electrically.

5. The operating unit of claim 2, wherein a common actuator is provided for moving both the display unit and the backlight unit, the actuator comprising length-variable actuator element with two ends averted from each other, the distance between the ends being variable by movement in opposite directions and one end being operatively connected with the display unit and the other end being operatively connected with the backlight unit for mechanical excitation of the display unit and the backlight unit.

6. The operating unit of claim 2, wherein the actuator or the actuators operates/operate electromechanically or piezo-electrically.

7. The operating unit of claim 3, wherein the actuator or the actuators operates/operate electromechanically or piezo-electrically.

* * * * *